United States Patent [19]
Barsoum et al.

[11] Patent Number: 5,882,561
[45] Date of Patent: Mar. 16, 1999

[54] PROCESS FOR MAKING A DENSE CERAMIC WORKPIECE

[75] Inventors: Michel W. Barsoum, Pennsauken, N.J.; Tamer El-Raghy, Philadelphia, Pa.

[73] Assignee: Drexel University, Philadelphia, Pa.

[21] Appl. No.: 755,277

[22] Filed: Nov. 22, 1996

[51] Int. Cl.$^6$ .................................................. C04B 35/56
[52] U.S. Cl. ................................ 264/65; 501/88; 501/89
[58] Field of Search ................................ 264/65; 501/88, 501/89

[56] References Cited

U.S. PATENT DOCUMENTS

| | | |
|---|---|---|
| 4,082,906 | 4/1978 | Amin et al. . |
| 4,961,529 | 10/1990 | Gottselig et al. . |
| 5,236,875 | 8/1993 | Trigg et al. . |
| 5,298,470 | 3/1994 | Chia et al. . |
| 5,451,365 | 9/1995 | Barsoum . |
| 5,470,806 | 11/1995 | Krstic et al. . |

OTHER PUBLICATIONS

M.W. Barsoum et al., "Layered Machinable Ceramics for High Temperature Applications," *Scripta Materialia*, 36(5):535–541 (1997).

T. El–Raghy et al., "Damage Mechanisms around Hardness Inentations in $Ti_3SiC_2$," *J. Am. Ceram. Soc.*, 80(2):513–516 (1997).

M.A. Pietzka et al., "Phase Equilibria in the Quaternary System Ti–Al–C–N," *J. Am. Ceram. Soc.*, 79(9):2321–2330 (Sep. 1996).

M.A. Pietzka et al., "Summary of Constitutional Data on the Aluminum–Carbon–Titanium System," *Journal of Phase Equilibria*, 15(4):392–400(1994).

Michel W. Barsoum et al., "Synthesis and Characterization of a Remarkable Ceramic: $Ti_3SiC_2$," *J. Am. Ceram. Soc.*, 79 [7], pp. 1953–1956 (Jul. 1996).

R. Radhakrishnan et al., "Synthesis of $Ti_3SiC_2$/SiC and $TiSi_2$/SiC Composites Using Displacemnet Reactions in the Ti–Si–C System," *Scripta Materialia*, 34:12, pp. 1809–1814 (1996).

Sowmya Arunajatesan et al., "Synthesis of Titanium Silicon Carbide," *J. Am. Ceram. Soc.*, 78 [3], pp. 667–672 (1995).

Lis et al., "$Ti_3SiC_2$–based Materials Prepared by HIP–SHS Techniques," *Materials Lett.* 22, pp. 163–168 (Feb. 1995).

Xiaohua Tong et al., Sythesis and High Temperature Mechanical Properties of $Ti_3SiC_2$/SiC Composite, *J. Mater. Sci.*, 30, pp. 3087–3090 (1995).

Takashi Okano et al., "Synthesis and Mechanical Properties of $Ti_3SiC_2$ Ceramic," *Advanced Materials '93, I/A: Ceramics, Powders Corrosion and Advanced Processing*, N. Mizutani et al., ed., Trans. Mat Res. Soc., Jpn., 14A, pp. 597–600 (1994).

P. Komarenko et al., "Synthesis of $Ti_3SiC_2$–Based Materials Using Microwave–Initiates SHS," *Ceramic Engineering and Science Proceedings*, 15, pp. 1028–1035 (1994).

C. Racault et al., "Solid–state Synthesis and Characterization of the Ternary Phase $Ti_3SiC_2$," *J. Mater. Sci.*, 29, pp. 3384–3392 (1994).

R. Pampuch et al., "$Ti_3SiC_2$–Based Materials Produced by Self–Propagating High–Temperature Synthesis (SHS) and Ceramic Processing," *J. Mater. Syn and Proc.*, 1(2), pp. 93–100 (1993).

R. Pampuch et al., "Solid Combustion Synthesis of $Ti_3SiC_2$," *J. European Ceram. Soc.*, 5, pp. 283–287 (1989).

T. Goto et al., "Chemically Vapor Deposited $Ti_3SiC_2$," *Mat. Res. Bull.*, 22, pp. 1195–1201 (1987).

T. Iseki et al., "Wetting and Properties of Reaction Products in Active Metal Brazing of SiC," *J. Ceram. Soc. Jpn. Inter. Ed.*, 97, pp.. 697–701 (1989).

S. Morozumi et al., "Bonding Mechanism Between Silicon Carbide and Thin Foils of Reactive Metals," *J. Mater. Sci.*, 20, pp. 3976–3982 (1985); and.

J.J. Nickl et al., "Gasphasenabscheidung im System Ti–Si–C," *J. Less–Common Metals*, 26, pp. 335–353 (1972) [in German with an English abstract].

*Primary Examiner*—Daniel J. Jenkins
*Attorney, Agent, or Firm*—Panitch Schwarze Jacobs & Nadel, P.C.

[57] ABSTRACT

A dense ceramic workpiece is made by a process of combining a powdered 312 component, e.g., $Ti_3SiC_2$, with a powdered component that is soluble in the 312 component, e.g., $TiSi_2$ in $Ti_3SiC_2$, forming the mixture into a green body, heating the green body under pressureless sintering conditions to a temperature above a point at which a liquid is formed but below the melting point of the 312 compound to yield a dense ceramic workpiece, and thereafter cooling the dense 312 ceramic workpiece.

28 Claims, No Drawings

PROCESS FOR MAKING A DENSE CERAMIC WORKPIECE

BACKGROUND OF THE INVENTION

The present invention relates to a process for making a dense ternary ceramic workpiece and more particularly, to a process for making a dense $Ti_3SiC_2$ workpiece.

A ternary titanium silicon carbide compound, having the formula $Ti_3SiC_2$ and referred to as a 312 compound because of its 3-1-2 stoichiometry (and sometimes called titanium carbosilicide), has been the subject of recent research investigations reported in the literature. Most of these reports have been directed to $Ti_3SiC_2$ synthesis methods and to characterization of its properties; see, e.g., Barsoum et al., *J. Am. Ceram. Soc.* 79: 1953–1956 (1996); Radhakrishnan et al., *Scripta Materialia* 34: 1809–1814 (1996); Arunajatesan et al., *J. Am. Ceram. Soc.* 78: 667–672 (1995); Lis et al., *Materials Lett.* 22: 163–168 (1995); Tong et al., *J. Mater. Sci.* 30: 3087–3090 (1995); Komarenko et al., *Ceram. Eng. Sci. Proc.* 15: 1028–1035 (1994); Okano et al., *Advanced Materials '93*, I, A., "Ceramics, Powders, Corrosion and Advanced Processing", Mizutani, ed., Elsevier Science B. V., Amsterdam, pp. 597–600 (1994); Racault et al., *J. Mater. Sci.* 29: 3384–3392 (1994); Pampuch et al., *J. Mater. Syn. Proc.* 1: 93–100 (1993); and Pampuch et al., *J. Europ. Ceram. Soc.* 5: 283–287 (1989).

Several reports describe use of or formation of $Ti_3SiC_2$ as a bonding agent for joining silicon carbide workpieces; see, e.g., Morozumi et al., *J. Mater. Sci.* 20: 3976–3982 (1985) and Gottselig et al., U.S. Pat. No. 4,961,529.

The physical characteristics described for this new ceramic material suggest that $Ti_3SiC_2$ may be a ceramic material with unusual properties superior to those of conventional brittle ceramic materials. $Ti_3SiC_2$ is a high strength, high temperature-stable material that has been characterized as having good workability, i.e., being ductile and exhibiting plastic behavior at elevated temperatures. These workability properties are highly desirable in ceramics intended for high strength, high temperature applications.

In the fabrication of bulk workpieces using $Ti_3SiC_2$, densification of the $Ti_3SiC_2$ is often desirable for ensuring optimal mechanical properties in the workpiece. The present invention provides a method of producing a dense form of $Ti_3SiC_2$ and other so-called 312 ternary compounds, in a procedure that avoids the need for high pressure densification techniques.

BRIEF SUMMARY OF THE INVENTION

This invention is directed to a process for making a dense ceramic workpiece by mixing a powdered $Ti_3XC_2$ component, where X is selected from Si, Ge, Al and Ga, and a powdered component that is soluble in a solid phase of $Ti_3XC_2$, the soluble component having a melting point below that of $Ti_3XC_2$ and being present in an amount of from about 0.1% to about 20% by volume based on the volume of the $Ti_3XC_2$ component, to provide a homogeneous mixture; forming the homogeneous mixture into a green body; heating the green body under a non-oxidizing atmosphere and without the application of significant pressure to a temperature above a point at which a liquid is formed in the green body but below the melting point of $Ti_3XC_2$; maintaining the heated green body at said temperature for a period of time sufficient to produce a ceramic workpiece with at least 80% of theoretical density; and cooling the $Ti_3XC_2$ ceramic workpiece below said temperature at which a liquid is formed in the green body.

The preferred $Ti_3XC_2$ in the process of this invention is $Ti_3SiC_2$. The soluble component preferred for use with $Ti_3SiC_2$ is $TiSi_2$, which is thermodynamically compatible with $Ti_3SiC_2$.

DETAILED DESCRIPTION OF THE INVENTION

The dense ceramic workpiece made according to this invention is a bulk product containing a ternary 312 ceramic compound such as $Ti_3SiC_2$, $Ti_3GeC_2$, $Ti_3AlC_2$, $Ti_3GaC_2$ and the like, as the predominant ceramic component. Preferably, the ternary 312 ceramic compound is $Ti_3SiC_2$. The ternary ceramic compound, e.g., $Ti_3SiC_2$, is preferably present in the dense ceramic workpiece as a single phase material, e.g., one which is a single phase of $Ti_3SiC_2$ that also contains the soluble component and may also contain minor amounts of impurities provided that such components are solubilized within the $Ti_3SiC_2$ as a single phase. References hereinafter in this disclosure to $Ti_3SiC_2$ are intended to be applicable to 312 compounds generally, including $Ti_3GeC_2$, $Ti_3AlC_2$, $Ti_3GaC_2$ and other $Ti_3XC_2$ compounds where X is an element that may be substituted for Si, except where the context of the statement indicates otherwise, e.g., in the Examples.

The densification process of this invention, as described in more detail below, involves use of a component that is soluble in a solid phase of $Ti_3XC_2$, and this soluble component is present in the green body containing the 312 compound. The soluble component results in the formation of a liquid at the temperatures and conditions used for heating the green body in this invention, and such liquid formation has been discovered to promote densification of the $Ti_3XC_2$ workpiece. The soluble component is preferably used in amounts that provide for its complete solubilization in the 312 compound and for disappearance of the liquid that forms in a transient manner during the heating step, as described below.

For the preferred ternary ceramic compound, $Ti_3SiC_2$, the $Ti_3SiC_2$ component that is used as the starting material in the method of this invention is a powdered component, which can be obtained in any of several ways. It should be understood that the $Ti_3GeC_2$, $Ti_3AlC_2$, $Ti_3GaC_2$ and other 312 counterparts of the preferred $Ti_3SiC_2$ component may be obtained in an analogous manner to that described below for the preferred $Ti_3SiC_2$ component, except that it should be noted that germanium (Ge) and gallium (Ga) do not form a carbide as do silicon (Si) and aluminum (Al). In one embodiment of the invention, the $Ti_3SiC_2$ component, i.e., starting material, may be powdered $Ti_3SiC_2$ in relatively pure form. However, the powdered $Ti_3SiC_2$ component may contain small amounts of impurities or foreign substances, provided that such contaminants do not interfere in an adverse manner with the product characteristics of the resultant dense ceramic workpiece.

The powdered $Ti_3SiC_2$ component may alternatively be provided as mixtures of titanium-containing, silicon-containing and carbon-containing components that provide the stoichiometric amounts required for formation of the 312 compound, $Ti_3SiC_2$. Such titanium-containing components may include titanium metal, titanium hydride ($TiH_2$), titania or titanium dioxide ($TiO_2$), titanium carbide (TiC), titanium silicide ($TiSi_2$), and the like. The titanium-containing component is preferably titanium, including titanium metal and titanium hydride. The carbon-containing component may include graphite, carbon black, titanium carbide, silicon carbide and the like. The preferred carbon-containing compound is graphite. The powdered silicon-containing component may include silicon, silicon carbide, silica ($SiO_2$) and the like. The preferred powdered silicon-containing component is powdered silicon carbide (SiC).

For 312 compounds other than $Ti_3SiC_2$, the powdered $Ti_3XC_2$ component may likewise be provided as mixtures of titanium-containing, X-containing and carbon-containing components that provide the stoichiometric amounts required for formation of the 312 compound, $Ti_3XC_2$. When $Ti_3AlC_2$ is the 312 compound, for example, the titanium-, aluminum- and carbon-containing components may include Ti, $TiH_2$, $TiO_2$, TiC, $TiAl_2$, $TiAl_3$, $Ti_5Al_{11}$, $Ti_2Al_5$, TiAl, graphite, $Al_2O_3$, $Al_4C_3$ and the like.

The powdered $Ti_3SiC_2$ component, which may be the titanium-, carbon- and silicon-containing powdered components as described above, is used in the method of this invention in finely divided form, i.e., particulate, granular or powdered form, hereinafter referred to as "powdered" form. The powdered components preferably have a particle size distribution that passes through a 325 mesh sieve (i.e., −325 mesh) and more preferably through a 400 mesh sieve (i.e., −400 mesh). The powdered components may comprise micron or submicron sized particles. Exceedingly finely divided powdered components, i.e., those containing a large proportion of submicron sized particles, may give rise to processing difficulties in combining such powdered components to provide the homogeneous powdered mixture that is formed into a green body in the process of this invention.

It should be noted that a powdered $Ti_3SiC_2$ component that is essentially powdered $Ti_3SiC_2$ is not a dense form of $Ti_3SiC_2$ since the powdered or particulate form of this component, even when cold pressed into a green body, has a relatively high void volume that precludes its being considered a dense form of $Ti_3SiC_2$.

The powdered components specified for use in the process of the present invention are typically available from commercial sources in powdered form. If necessary, however, conventional solids size reduction processing methods may be used to produce a powdered component appropriate for use in this invention. Such conventional size reduction techniques include well known milling and comminution methods and equipment, such as ball milling, vibratory milling, jet milling, attrition milling and the like. Such solid size reduction may be carried out with or without milling media or other additives, including fluid mixing media, used in conventional solids size reduction processing. Size reduction of the components may also be carried out concurrently with a mixing step, e.g., in which the powdered $Ti_3XC_2$ component is mixed with the soluble component to form a homogeneous mixture.

The powdered component that is soluble in a solid phase of $Ti_3SiC_2$ should have particle sizing characteristics similar to those described for the powdered $Ti_3SiC_2$ component.

The powdered component that is soluble in a solid phase of $Ti_3SiC_2$, or of another ternary 312 compound of the general formula $Ti_3XC_2$ as described above, is a component that has a melting point below that of $Ti_3XC_2$ and that is soluble, at least to a limited extent, in the $Ti_3XC_2$ when the latter is a solid phase. Such solubilization occurs at temperatures and conditions used for heating the green body, when a liquid is formed and then substantially or completely disappears into the 312 compound.

Preferred components soluble in a solid phase of $Ti_3SiC_2$ (or in a solid phase of other 312 ternary compounds) are those having a melting point within the temperature range of about 600° C. to about 2000° C., more preferably about 800° C. to about 1600° C., and most preferably about 1000° C. to about 1500° C. For dense ceramic workpieces which are intended for high temperature applications, the soluble component preferably has a melting point in the range of about 1000° to about 2000° C. and more preferably about 1200° C. to 1800° C.

The powdered component that is soluble in a solid phase of the 312 compound, i.e., $Ti_3XC_2$, is used in an amount in the process of this invention in the range of from about 0.5% to about 20% by volume, based on the volume of the $Ti_3XC_2$ component. Preferably, the amount of powdered soluble component used should be in the range of about 1% to about 15% by volume and more preferably about 5% to about 10% by volume, all based on the volume of the $Ti_3XC_2$ component.

The soluble component is preferably present in an amount below the maximum solubility of such component in the $Ti_3SiC_2$ phase, so that the resulting dense ceramic workpiece typically exhibits a single phase of $Ti_3SiC_2$, without the presence of a second phase of excess soluble component. For the preferred soluble components, the solubility of such components in the solid phase of 312 compound is typically in the range of about 0.5 to about 10 wt %, based on the weight of the 312 compound containing the solubilized component. More preferably, the minimum solubility of the soluble component in the solid phase of 312 compound is at least about 1 wt % and most preferably at least about 3 wt %, based on the weight of the 312 compound containing the solubilized component.

A preferred category of soluble components is those compounds which are thermodynamically compatible with the specific 312 component used. The term "thermodynamically compatible" refers to Ti-, X- and C-containing components which will co-exist with $Ti_3XC_2$, without significantly reacting with the $Ti_3XC_2$ to convert the latter to another species at temperatures and conditions used for heating the green body in the process of this invention. Such compounds may readily be identified by reference to a Ti-X-C ternary phase diagram, on which regions are located in which the ternary 312 compound, $Ti_3XC_2$, co-exists with other Ti-, X-, and C-containing compounds; see, e.g., Arunajatesan et al., *J. Am. Ceram. Soc.* 78: 667–672 (1995) which shows a Ti-Si-C ternary phase diagram for 1200° C., at p. 667, and Nickl et al., *J. Less-Common Metals,* 26: 335–353 (1972) which likewise shows a Ti-Si-C ternary phase diagram for 1200° C., at p. 336. Such compounds thermodynamically compatible with $Ti_3XC_2$ generally share a region, e.g., a triangle, with $Ti_3XC_2$ on the phase diagram. Thus, the following are thermodynamically compatible with $Ti_3SiC_2$: SiC, $TiSi_2$, $Ti_5Si_3C_X$ (including $Ti_5Si_3$); and $TiC_{1-x}$. The following are not thermodynamically compatible with $Ti_3XC_2$: Ti, Si, C, TiSi and $Ti_5Si_4$.

Thermodynamically compatible components that are preferred for used as the component soluble in a solid phase of $Ti_3SiC_2$ include $TiSi_2$ and $Ti_5Si_3$; $TiSi_2$ is most preferred. For $Ti_3AlC_2$, another 312 compound, thermodynamically compatible components that may be used as the component soluble in a solid phase of $Ti_3AlC_2$ include $TiAl_2$, $Ti_5Al_{11}$ and TiAl.

References in this specification to the component that is soluble in a solid phase of the 312 compound should be understood to include those preferred soluble compounds that are thermodynamically compatible with the 312 compound.

The component soluble in a solid phase of the 312 ternary compound may include components that are not thermodynamically stable with the 312 compound, such as Li, Na, Mg, Al, Si, P, S, Mn, Fe, Co., Ni, Cu, Zn, Ga, Ge, As, Se, Y, Zr, Ag, Cd, In, Sn, Sb, Au, Bi, Pb, Sc, Ac, V, Cr, Os, Nb, Mo, Ru, Hf, Ta, W, Re, B, La and includes compounds, alloys and intermetallics containing at least one of these elements and mixtures containing the same. Among the members of this group, the following are preferred: Al, Si, Mn, Fe, Co, Ni, Cu, Zn, Ag, Sn, Sb, Au, Bi and Pb and compounds, alloys, intermetallics containing at least one of these elements and mixtures containing the same.

The powdered $Ti_3SiC_2$ component and powdered component that is soluble or thermodynamically compatible with $Ti_3SiC_2$ are mixed, blended or likewise combined to provide a homogenous mixture in the process of this invention. This combination of powdered components may be carried out using conventional mixing techniques typically used to mix or blend powdered materials into a homogenous mixture. Conventional solids-mixing equipment includes tumbling devices such as double cone or V-blenders, ribbon mixers, vertical screw mixers and the like. The mixing step may optionally be combined with milling, grinding or comminution of the components to prepare a powdered homogeneous mixture with the desired particle size specifications. The powdered components should be mixed for a period of time sufficient to provide a homogeneous mixture in which each of the powdered components is uniformly distributed throughout the volume of the entire mixture. Mixing times using conventional mixing equipment may range from a few minutes to one or more hours.

Mixing of a powdered $Ti_3SiC_2$ component from powdered Ti-, Si- and C- containing components and mixing of the $Ti_3SiC_2$ component with the soluble or thermodynamically compatible component may also optionally be carried out as a single mixing step, in a single unit operation, rather than as separate sequential steps.

The homogeneous mixture of well-mixed powdered components is then formed into a green body. The term "green body" refers to the workpiece, i.e., solid object, that is formed from the homogeneous mixture of powdered components before the same is subjected to a heat treatment at elevated temperatures. The term "green body" is well known in the ceramic art and is understood to refer to an unfired article made from a ceramic-forming batch material. The green body formed in the process of this invention is preferably made by cold pressing, in which the homogeneous powder mixture is introduced into a die cavity having the shape of the desired workpiece and then compressed into the desired workpiece shape, without the application of heat and without the use of an elevated temperature. After cold pressing, the green body is removed from the die. The pressures employed during cold pressing to form a green body depend on the size and configuration of the green body shape, but typically are in the range of 20 MPa to about 200 MPa. As an alternative to forming the green body by cold pressing, the green body may be produced by extrusion, injection molding or uniaxial or isostatic pressing techniques using conventional equipment.

Binders, dispersants, mixing media, lubricants or other additives may be added to make the homogeneous mixture of powdered components amenable to such conventional processing techniques for forming a green body.

The heating of the green body may be accomplished in conventional furnaces, e.g., resistance or induction-heated or microwave furnaces. The atmosphere during the heating step may be a vacuum and/or a non-oxidizing atmosphere, including inert or reducing atmospheres. An inert atmosphere may be provided using a gas such as argon, helium or nitrogen, although argon and helium are preferred over nitrogen since the latter may retard the rate at which the green body is converted to a dense ceramic workpiece.

Pressureless sintering conditions are used during the heating of the green body under a non-oxidizing atmosphere. "Pressureless sintering conditions" is a term well known to those skilled in the ceramics art and is a term that refers to heat treatment of the green body carried out without the application of significant externally applied pressure. Typically pressureless sintering may be carried out under vacuum or, alternatively, under a non-oxidizing atmosphere that is maintained at about ambient pressure, i.e., at about one atmosphere pressure. It is to be understood, however, that a positive pressure may be maintained during the heat treatment of the green body in the process of this invention, provided that such applied pressure is not significant, i.e., not above about 1 MPa (10 atmospheres).

During the heat treatment step, the green body is heated to a temperature above a point at which a liquid is formed in the green body, but below the melting point of $Ti_3SiC_2$. This temperature is typically near the melting point of the soluble or thermodynamically compatible component that is present in admixture with the $Ti_3SiC_2$ component in the homogeneous mixture used to form the green body. As discussed earlier, a preferred soluble component for use with $Ti_3SiC_2$ is $TiSi_2$, which is thermodynamically compatible with $Ti_3SiC_2$, and the melting point of $TiSi_2$ is approximately 1475° C. The melting point of $Ti_3SiC_2$, the preferred 312 compound, is reported to be above about 3000° C. Another 312 ternary compound that may be used in this invention is $Ti_3AlC_2$, and three compounds that may be used as the soluble component with $Ti_3AlC_2$ are $TiAl_3$, $Ti_5Al_{11}$ and TiAl, which are each thermodynamically compatible with $Ti_3AlC_2$. The respective melting points of $TiAl_3$, $Ti_5Al_{11}$ and TiAl are approximately 1387° C., 1416° C. and 1460° C.

The green body is generally at ambient temperature, about 15° C. to about 30° C., prior to the heating step, and the heating of the green body in the furnace is normally carried out at a controlled heating rate to avoid unnecessary thermal stress on the green body. Heating rates that are typically used in firing ceramics are satisfactory, e.g., within the range of about 100° C./hour to about 1000° C./hour, preferably about 300° C./hour to about 800° C./hour. The temperature reached and maintained during the heating step is generally within the temperature range of about 600° C. to about 2000° C., more preferably about 800° C. to about 1800° C. and most preferably about 1000° C. to about 1600° C. Pressureless sintering at temperatures in excess of about 1600°–1800° C. may result in loss of some of the soluble or thermodynamically compatible component, e.g., by decomposition, so lower temperatures are preferred.

During the heat treatment step, the green body is maintained at the selected temperature for a period of time sufficient to convert the green body to a dense ceramic $Ti_3SiC_2$-containing workpiece. This period may range from as little as about five minutes to as much as about ten hours or more, and is preferably within the range of about 20 minutes to about three hours.

The heating temperature and period are generally selected to provide for the appearance or formation of a liquid phase during the heating step and the subsequent disappearance of the liquid (at the temperature being maintained) into the 312 compound which forms. Densification of the resulting 312 compound also occurs during the formation and disappearance of the liquid phase that occurs in the heating step. In the densification process of this invention, the disappearance of the liquid phase is believed to occur by its solubilization into the 312 compound that is either present or formed in the heating step. This contrasts with the use of transient liquid phase sintering procedures described in the prior art for non-312 ceramics in which the liquid is removed by evaporation or sublimation. In the process of this invention, heating of the 312 compound for extensive periods following the disappearance of the liquid phase generally does not promote further or additional densification of the product.

The dense ceramic workpiece of this invention, made from the $Ti_3SiC_2$ as the preferred 312 compound, is characterized by being a relatively pure ceramic that is preferably a single phase of $Ti_3SiC_2$. Small amounts of non-$Ti_3SiC_2$ components, in addition to the soluble component or thermodynamically compatible component, may be present as solubilized components within the $Ti_3SiC_2$ single phase, but such amounts are generally less than about 10% by weight, and preferably less than about 5% by weight of the final product. One characteristic of the preferred dense ceramic workpiece of this invention that distinguishes it from $Ti_3SiC_2$ made by prior art methods is the substantial absence of other phases, e.g., TiC and SiC or other components in addition to the desired $Ti_3SiC_2$.

The resulting dense ceramic workpiece obtained from heat treatment of the green body is allowed to cool, typically by furnace cooling, i.e., by cooling the workpiece while still in the furnace after heating has ceased. The dense ceramic workpieces made by the process of this invention exhibit good heat shock resistance, so the rate of cooling of the heat treated dense ceramic workpiece may be relatively rapid. A dense $Ti_3SiC_2$ ceramic workpiece typically exhibits a heat shock resistance value of up to about 2800° C. per minute.

The $Ti_3SiC_2$ ceramic workpieces made according to this invention also exhibit excellent oxidative resistance and are excellent thermal and electrical conductors; thermal and electrical conductivity is better than that of Ti alone.

They also exhibit relatively low hardness (in contrast to silicon carbide and other ceramics) but are harder than most metals, yet possess excellent ductility at elevated temperatures and are readily machinable. The $Ti_3SiC_2$ ceramic workpieces possess superb plasticity at elevated temperatures.

The process of this invention results in conversion of the heat treated green body into a dense ceramic workpiece with at least 80% of theoretical density, more preferably at least 90% of theoretical density and most preferably at least about 95% of theoretical density. The dense ceramic workpiece made according to the process of this invention exhibits a minor amount of porosity that is typically characterized by having closed pores rather than open or interconnected porosity.

Since the dense ceramic workpieces made according to this invention exhibit closed pores, further densification or complete densification (essentially 100%: 4.53 g/cm$^3$) may readily be accomplished by hot pressing or hot isostatic pressing (HIP) procedures. It is important to note that such densification may be carried out without the use of a can, i.e., hermetically sealed metal or glass enclosure, used to encase the powder compact and act as the barrier means to transfer the applied gas pressure to an isostatic compaction force on the powdered compact. Further densification of dense ceramic workpieces by hot pressing is limited to those workpiece shapes and configurations which can be subjected to pressure at elevated temperatures in a die. Consequently, hot isostatic pressing (without the use of a can) is the preferred means for carrying out further densification of the dense ceramic workpieces, since such HIP procedures are typically carried out with a cold-wall autoclave having an internal furnace in which an inert gas, typically argon, is used as the pressurizing fluid to carry out further densification of the dense ceramic workpiece of this invention.

The present invention is illustrated further by the following nonlimiting Examples.

EXAMPLE 1

This Example illustrates in situ formation of $Ti_3SiC_2$ and its densification in a single procedure. The following quantities of powdered components were combined: 47.9 g, 99.99% Ti (−325 mesh), 13.3 g SiC (about 1 $\mu$m mean particle size), 4 g graphite (about 1 $\mu$m mean particle size) and 9.75 g, $TiSi_2$ (−325 mesh). The molar amounts of the first three components, titanium, silicon carbide and graphite, were present in molar ratios of 1:0.33:0.33, to provide titanium:silicon:carbon in a stoichiometric molar ratio for such components of 3:1:2. The $TiSi_2$ component was present in an amount of 13.5% by volume based on the volume of the first three components (15 wt % based on the weight of the first three components). After being combined, the powders were then dry-mixed in a V-blender for two hours.

A green body in the shape of a rectangular bar or billet having dimensions of 76.2 mm×12.7 mm×15 mm was prepared from the well-mixed powdered mixture, by cold pressing 50 g powdered mixture in a die under 180 MPa. The green body thus formed was placed in a vacuum furnace and was subjected to the following temperature cycle: a heating rate of 600° C./hr. was used to reach a temperature of 1600° C. and that temperature was held for three hours, the heat-treated ceramic bar was thereafter furnace cooled. After cooling, the resulting ceramic bar was determined to be 95% of theoretical density. Analysis of the dense ceramic product by x-ray diffraction showed that the product was predominantly $Ti_3SiC_2$ and contained only a small amount of $TiSi_2$, about 5% by volume $TiSi_2$.

The densification accomplished by the procedure described for this Example resulted in a dense ceramic product having closed pores, as evidenced by the following test. Since it is well known that porous samples cannot be densified by a hot isostatic pressing (HIP) procedure if the pores are open pores or are interconnected, the ceramic product was placed in an isostatic press and pressed under an argon atmosphere without a can. During the HIP procedure, the heating rate was 30° C./min. to a temperature of 1700° C. and that temperature was maintained for one hour under a pressure of 70 MPa. This HIP treatment without a can resulted in a material that was fully dense and determined to contain predominantly $Ti_3SiC_2$ with only about 5% by volume $TiSi_2$ present. This HIP procedure (carried out without a can) confirmed that the dense product made by the method of this Example can be fully densified without having to resort to an HIP procedure using a can, a major expense and complication associated with HIP procedures conventionally used for densifying ceramics.

EXAMPLE 2

The procedure of Example 2 was identical to that described for Example 1, except that a smaller amount of $TiSi_2$, 6.52 g instead of 9.78 g, was used in this Example. The $TiSi_2$ was present in an amount of 9% by volume based on the volume of the titanium, silicon carbide and graphite components (10 wt % based on the weight of the titanium, silicon carbide and graphite components). The green body of this Example 2 was subjected to the same temperature cycle as that used in Example 1. After cooling, the resulting ceramic product was determined to be about 85% of theoretical density. Analysis of the dense ceramic product by x-ray diffraction showed that it contained predominantly $Ti_3SiC_2$, with less than about 5% by volume $TiSi_2$ being present.

EXAMPLE 3

This Example describes the use of a powdered $Ti_3SiC_2$ component and a powdered $TiSi_2$ component that are combined and used to make a dense ceramic product. A powdered $Ti_3SiC_2$ component was first prepared as follows. The following quantities of powdered components were combined: 47.9 g 99.99% Ti (−325 mesh); 13.3 g SiC (about 1 $\mu$m mean particle size); and 4 g graphite (about 1 $\mu$m mean particle size). No $TiSi_2$ component was present. The combined powdered components were dry-mixed in a V-blender for two hours. The well-mixed powder mixture was cold pressed under 180 MPa pressure into the shape of a rectangular bar having dimensions of 76.2 mm×12.7 mm×15 mm. The resulting cold pressed bar was placed in a vacuum furnace and heated under vacuum for one hour at a heating rate of 600° C./hr. and thereafter furnace cooled. The resulting bar contained $Ti_3SiC_2$, according to X-ray diffraction analysis. This $Ti_3SiC_2$-containing bar was crushed and ground to a particle size of less than 325 mesh.

All of the resulting $Ti_3SiC_2$ powder was combined with 9.78 g $TiSi_2$ (−325 mesh), and the combined powdered components were dry-mixed in a V-blender for two hours. A green body was formed from these well-mixed powdered components using the cold pressing procedure described for Example 1. The resulting green body was placed in a vacuum furnace and subjected to the same temperature cycle as that described for Example 1. After cooling, the resulting ceramic bar was determined to be about 95% of theoretical density, containing about 5% pores that were fully closed. Analysis of the dense ceramic product by x-ray diffraction showed that it was predominantly $Ti_3SiC_2$ and contained only a small amount of $TiSi_2$, about 5% by volume.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A process for making a dense ceramic workpiece which comprises
   (i) mixing a powdered $Ti_3XC_2$ component, where X is selected from the group consisting of Si, Ge, Al and Ga, and a powdered component that is soluble in a solid phase of $Ti_3XC_2$, the soluble component having a melting point below that of $Ti_3XC_2$ and being present in an amount of from about 0.1% to about 20% by volume based on the volume of the $Ti_3XC_2$ component, to provide a homogeneous mixture;
   (ii) forming the homogeneous mixture into a green body;
   (iii) heating the green body under a non-oxidizing atmosphere without the application of significant pressure to a temperature above a point at which a liquid is formed in the green body but below the melting point of $Ti_3XC_2$;
   (iv) maintaining the heated green body at said temperature for a period of time sufficient to produce a ceramic workpiece with at least 80% of theoretical density; and
   (v) cooling the $Ti_3XC_2$ ceramic workpiece below said temperature at which a liquid is formed in the green body.

2. The process of claim 1 wherein $Ti_3XC_2$ is $Ti_3SiC_2$.

3. The process of claim 2 wherein the $Ti_3SiC_2$ component is a powdered mixture of titanium-, carbon- and silicon-containing components in stoichiometric amounts that provide for formation of $Ti_3SiC_2$.

4. The process of claim 3 wherein the titanium-, carbon- and silicon-containing components are selected from the group consisting of Ti, $TiH_2$, $TiO_2$, TiC, $TiSi_2$, graphite, Si and SiC.

5. The process of claim 3 wherein the $Ti_3SiC_2$ component is a powdered mixture of titanium, graphite and silicon carbide in stoichiometric amounts that provide for formation of $Ti_3SiC_2$.

6. The process of claim 2 wherein the $Ti_3SiC_2$ component is powdered $Ti_3SiC_2$.

7. The process of claim 2 wherein the component soluble in a solid phase of $Ti_3SiC_2$ is selected from the group consisting of $TiSi_2$ and $Ti_5Si_3$.

8. The process of claim 1 wherein $Ti_3XC_2$ is $Ti_3AlC_2$.

9. The process of claim 8 wherein the $Ti_3AlC_2$ component is a powdered mixture of titanium-, carbon- and aluminum-containing components in stoichiometric amounts that provide for formation of $Ti_3AlC_2$.

10. The process of claim 9 wherein the titanium-, carbon- and aluminum-containing components are selected from the group consisting of Ti, $TiH_2$, $TiO_2$, TiC, $TiAl_2$, $TiAl_3$, $Ti_5Al_{11}$, $Ti_2Al_5$, TiAl, graphite, $Al_2O_3$ and $Al_4C_3$.

11. The process of claim 8 wherein the $Ti_3AlC_2$ component is powdered $Ti_3AlC_2$.

12. The process of claim 8 wherein the component soluble in a solid phase of $Ti_3AlC_2$ is selected from the group consisting of $TiAl_2$, $Ti_5Al_{11}$ and TiAl.

13. The process of claim 1 wherein $Ti_3XC_2$ is selected from the group consisting of $Ti_3GeC_2$ and $Ti_3GaC_2$.

14. The process of claim 13 wherein $Ti_3XC_2$ is $Ti_3GeC_2$ and the $Ti_3GeC_2$ component is a powdered mixture of titanium-, carbon- and germanium-containing components in stoichiometric amounts that provide for formation of $Ti_3GeC_2$.

15. The process of claim 13 wherein $Ti_3XC_2$ is $Ti_3GaC_2$ and the $Ti_3GaC_2$ component is a powdered mixture of titanium-, carbon- and gallium-containing components in stoichiometric amounts that provide for formation of $Ti_3GaC_2$.

16. The process of claim 1 wherein the component soluble in a solid phase of $Ti_3XC_2$ is present in an amount below the maximum solubility of such component in the solid $Ti_3XC_2$ phase.

17. The process of claim 16 wherein the resulting ceramic workpiece comprises a single phase of $Ti_3XC_2$.

18. The process of claim 1 wherein the component soluble in a solid phase of $Ti_3XC_2$ is selected from the group consisting of Li, Na, Mg, Al, Si, P, S, Ti, Mn, Fe, Co, Ni, Cu, Zn, Ga, Ge, As, Se, Y, Zr, Ag, Cd, In, Sn, Sb, Au, Bi, Pb, Sc, Ac, V, Cr, Os, Nb, Mo, Ru, Hf, Ta, W, Re, B, La and compounds, alloys, intermetallics and mixtures containing the same.

19. The process of claim 1 wherein the formation of the green body is carried out by cold pressing the homogeneous mixture.

20. The process of claim 1 wherein the heated green body is maintained at a temperature of from about 600° C. to about 2000° C.

21. The process of claim 1 wherein the heated green body is maintained at said temperature for about 5 minutes to about 10 hours.

22. The process of claim 1 wherein the pressure during the heating of the green body is maintained below about 1 MPa.

23. A process for making a dense ceramic workpiece which comprises (i) mixing titanium-, carbon- and silicon-containing components in powdered form and in stoichiometric amounts sufficient for formation of $Ti_3SiC_2$, to provide a powdered $Ti_3SiC_2$ component mixture;

(ii) preparing a homogeneous mixture by mixing said powdered $Ti_3SiC_2$ component mixture with a powdered component thermodynamically compatible with $Ti_3SiC_2$ and selected from the group consisting of $TiSi_2$ and $Ti_5Si_3$, the thermodynamically compatible component being in powdered form and being present in amounts of from about 0.1% to about 20% by volume based on the volume of the powdered $Ti_3SiC_2$ component mixture;

(iii) forming the homogeneous mixture into a green body;

(iv) heating the green body under a non-oxidizing atmosphere without the application of significant pressure to a temperature above a point at which a liquid is formed in the mixture but below the melting point of $Ti_3SiC_2$;

(v) maintaining the heated green body at said temperature for a period of time sufficient to form a $Ti_3SiC_2$ workpiece having at least 80% of theoretical density; and (vi) cooling the $Ti_3SiC_2$ ceramic workpiece below said temperature at which a liquid is formed in the green body.

24. The process of claim 23 wherein steps (i) and (ii) are carried out as a single mixing step.

25. The process of claim 23 wherein the titanium-, carbon- and silicon-containing components are selected from the group consisting of Ti, $TiH_2$, $TiO_2$, TiC, $TiSi_2$, graphite, Si and SiC.

26. The process of claim 23 wherein the thermodynamically compatible component is $TiSi_2$ and the $TiSi_2$ is present in an amount below its maximum solubility in $Ti_3SiC_2$.

27. A dense ceramic workpiece made according to the process of claim 1.

28. A dense ceramic workpiece made according to the process of claim 23.

* * * * *